United States Patent
Watanabe et al.

[11] Patent Number: 6,083,644
[45] Date of Patent: Jul. 4, 2000

[54] NON-AQUEOUS ELECTROLYTE SECONDARY BATTERY

[75] Inventors: Shunji Watanabe; Shinichi Takasugi; Tsugio Sakai; Kensuke Tahara; Akifumi Sakata; Hideharu Onodera, all of Chiba, Japan

[73] Assignee: Seiko Instruments Inc., Japan

[21] Appl. No.: 08/978,825

[22] Filed: Nov. 26, 1997

[30] Foreign Application Priority Data

Nov. 29, 1996 [JP] Japan ................................. 8-320122
Nov. 29, 1996 [JP] Japan ................................. 8-320123

[51] Int. Cl.⁷ ............................................... H01M 4/48
[52] U.S. Cl. ................................ 429/231.1; 429/218.1
[58] Field of Search ............................. 429/221, 231.1, 429/218.1

[56] References Cited

U.S. PATENT DOCUMENTS

| | | | |
|---|---|---|---|
| 5,395,711 | 3/1995 | Tahara et al. | 429/197 |
| 5,401,599 | 3/1995 | Tahara et al. | 429/218 |
| 5,418,084 | 5/1995 | Georgopoulos | 429/54 |
| 5,464,708 | 11/1995 | Neat et al. | 429/218 |
| 5,618,640 | 4/1997 | Idota et al. | 429/194 |
| 5,766,796 | 6/1998 | Abraham et al. | 429/192 |

FOREIGN PATENT DOCUMENTS

| | | |
|---|---|---|
| 582173A1 | 2/1994 | European Pat. Off. . |
| 617474A1 | 9/1994 | European Pat. Off. . |
| 630064A1 | 12/1994 | European Pat. Off. . |
| 651450A1 | 5/1995 | European Pat. Off. . |
| 4412758 | 3/1995 | Germany . |
| 2298516 | 9/1996 | United Kingdom . |
| WO9308612 | 4/1993 | WIPO . |
| WO9701193 | 1/1997 | WIPO . |

OTHER PUBLICATIONS

Patent Abstracts of Japan, vol. 095, No. 010 Nov. 30, 1995.
Bonino et al., "Anatase as a Cathode Material in Lithium Organic Electrolyte Rechargeable Batteries", J. Power Sources, vol. 6, pp. 261–270. (No Month Available), 1981.

*Primary Examiner*—Maria Nuzzolillo
*Assistant Examiner*—Carol Chaney
*Attorney, Agent, or Firm*—Adams & Wilks

[57] ABSTRACT

A 1.5 V non-aqueous electrolyte secondary battery having high energy density, excellent charge and discharge characteristics and long cycle life is provided. The non-aqueous electrolyte secondary battery uses, as the negative electrode active material, lithium-containing silicon oxide represented by the compositional formula $Li_xSiO_y$ and defined such that the lithium content x and oxygen amount y are satisfied with $1.5 \leq x \leq 4.5$ and $0 < y < 2$, respectively, and also uses, as the positive electrode, lithium-containing titanium oxide represented by the general formula $Li_xTi_yO_4$ wherein $0 \leq x \leq 3$ and $1.6 \leq y \leq 2.2$ or lithium-containing iron sulfide represented by the general formula $Li_xFeS_y$ wherein $x \leq 1.1$ and $0.5 \leq y \leq 2.5$, so that a secondary battery of about 1.5 V having high energy density, less inner resistance and excellent charge and discharge characteristics can be obtained. The non-aqueous electrolyte secondary battery has high charge and discharge efficiency, does not cause defect such as inner short-circuit due to formation of dendrite, and it is very stable with a long cycle life.

8 Claims, 8 Drawing Sheets

NON-AQUEOUS ELECTROLYTE SECONDARY BATTERY

BACKGROUND OF THE INVENTION

The present invention relates to a non-aqueous electrolyte secondary battery using a lithium ion-conductive non-aqueous electrolyte in which a material capable of incorporating and releasing lithium ion is used as a positive electrode active material and a negative electrode active material, and a method of producing the same. More particularly, the invention relates to a novel secondary battery having high energy density and excellent charge and discharge characteristics at a voltage of about 1.5 V, a long cycle life, and a high reliability.

In recent years, following the remarkable development of portable type electronics equipment and devices, communication equipment and devices, and the like, various kinds of equipment and devices which require large current outputs for batteries as a power supply have been realized. It is therefore strongly desired to produce high energy density secondary batteries from the standpoint of economics, and compact size and light-weight of the devices. Further, with the necessity of devices having low voltage, the research and development for non-aqueous electrolyte secondary batteries having high energy density of about 1.5 V are conducted, a part of which is now in practical use.

Conventionally, titanium oxide and lithium-containing titanium oxide which are an active material constituting a negative electrode are described in Japanese Laid-Open patent application No. Sho 57-152669(hereinafter referred to as JP-A) and Japanese Patent Publication No. Sho 63-8588(hereinafter referred to as JP-B). Further, JP-B-63-1708 describes an example of a combination of a negative electrode using titanium oxide and a positive electrode using manganese dioxide. However, from the problems such that a voltage is 1 V, which is too low, and charge and discharge cycle life is short, it has not been in practical use. Furthermore, JP-A-6-275263 and JP-A-7-320784 describe a battery using improved lithium-containing titanium oxide as a negative electrode, but a positive electrode has not yet been investigated. That is, there has not been developed a secondary battery of about 1.5 V comprising a combination of a lithium-containing titanium oxide as a positive electrode and lithium-containing silicon oxide as a negative electrode.

Further, sulfides of iron have been investigated as a thermobattery or a primary battery, but a lithium ion type secondary battery using a non-aqueous solvent has not been investigated so much.

Nickel-cadmium batteries and nickel-hydrogen batteries which are conventional batteries of about 1.5 V have a small electric capacity. Therefore, there has been the problem that it is difficult to decrease its size. Further, 1.5 V batteries using lithium-containing titanium oxide as a negative electrode use manganese oxide or lithium-containing manganese oxide as a positive electrode. Therefore, the battery capacity is substantially determined by the capacity of manganese oxide or lithium-containing manganese oxide, and as a result, it has been difficult to further increase the capacity of the battery. In addition, it has been impossible to achieve decreasing inner resistance of the battery and increasing charge and discharge characteristics without sacrificing the capacity of the battery.

Lithium-containing titanium oxide and lithium-containing iron sulfide are a type that only lithium ions (cation) are input into and output from between layers of crystal, lattice positions or gaps among lattices of crystal by means of intercalation and deintercalation reactions and the like as is the case of metal chalcogenide such as $TiS_2$, $MoS_2$, $NbSe_3$, and the like, and metal oxide such as $MnO_2$, $MoO_3$, $V_2O_5$, $Li_xCoO_2$, $Li_x$, $NiO_2$, $Li_xCo_{1-y}Ni_yO_2$, $Li_xMn_2O_4$, $Li_xMnO_2$, and the like. As a result of various improvements, lithium-containing titanium oxide has become to have a flat charge and discharge curve at about 1.5 V. However, its voltage is low as 1.5 V to lithium. Therefore, investigations have been made as a negative electrode, but investigations have not been made as a positive electrode.

Iron sulfide has investigated to apply to a thermal battery as a secondary battery. However, as a non-aqueous battery its capacity is large, but reversibility is poor, so that it has been investigated only as a primary battery. Thus, no great investigations have been made to lithium ion type secondary batteries using a non-aqueous solvent.

On the other hand, as a negative electrode active material when metallic lithium is used alone, its electrode voltage is poorest. Therefore, it is possible to produce about 1.5 V secondary battery if such is combined with a positive electrode using the above-described positive electrode active materials. However, there have been problems that dendrite or passive compounds are formed on lithium negative electrode due to charge and discharge, deterioration due to charge and discharge is large, and cycle life is short. In order to solve those problems, it has been proposed to use (1) alloys of lithium and other metals such as Al, Zn, Sn, Pb, Bi, Cd, or the like, (2) intercalation compounds or insertion compounds in which lithium ions are incorporated in a crystalline structure or an amorphous structure of, for example, carbonaceous materials obtained by clacining inorganic compounds such as $WO_2$, $MoO_2$, $Fe_2O_3$, $TiS_2$, $Li_xCo_{1-y}Ni_yO_2$, $Li_xWO_y$, or the like; graphite, or organic materials, and (3) materials capable of absorbing and releasing lithium ions, such as conductive polymers, e.g., polyacetone or polyacetylene and the like, having lithium ion doped therein.

However, when a battery is constituted by materials capable of incorporating and releasing lithium ions, other than the above-described metallic lithium, as a negative electrode active material, the electrode potential of those negative electrode active materials is nobler than the electrode potential of metallic lithium. Therefore, there is a disadvantage that the operating voltage is fairly lower as compared with the battery using metallic lithium alone as the negative electrode active material. For example, the operating voltage is lowered by 0.2 to 0.8 V when using alloys of lithium and Al, Zn, Pb, Sn, Bi, Cd, or the like, 0 to 1 V in a carbon-lithium intercalation compound, and 0.5 to 1.5 V when using a lithium ion insertion compound such as $MoO_2$, $WO_2$ or the like. For this reason, it was extremely difficult to form a 1.5 V secondary battery even by combining the above negative electrode with a positive electrode of lithium-containing titanium oxide or lithium-containing iron sulfide.

In addition, since elements other than lithium are involved as elements constituting the negative electrode, the capacity and energy density per volume and weight are considerably lowered. Further, where the above alloys (1) of lithium and other metals are used, the problem occurs that the utilization efficiency of lithium is low during charge and discharge, and repeating charge and discharge causes cracks or breaks in the electrode, resulting in a shorter cycle life. Where the battery uses the above lithium intercalation compound or insertion compound (2), deteriorations such as decay of the crystal structure and generation of irreversible substances arise due to excess charge and discharge, and further there is a disadvantage that since many compounds have higher (nobler) electrode-potential, the battery using the same has a lower output voltage. Where the battery uses the conductive polymers (3), there is the problem that the charge and discharge capacity, in particular, the charge and discharge capacity per unit volume, is small.

For those reasons, to obtain a secondary battery having high voltage, high energy density, excellent charge and discharge characteristics, and long cycle life, there is required a negative electrode active material having a larger effective charge and discharge capacity, that is, a larger amount of reversible absorption and release of lithium ions with a lower (baser) electrode potential for lithium but without deteriorations such as decay of the crystal structure and generation of irreversible substances and the like due to the absorption and release of the lithium ions during charging and discharging.

The present inventors previously found that lithium-containing silicon oxide represented by the compositional formula $Li_xSiO_y$ (provided $0 \leq x$ and $0 < y < 2$) can incorporate and release lithium ions electrochemically, stably and repeatedly for a lithium standard electrode (metallic lithium) in the electrode potential range of 0 to 3 V in a non-aqueous electrolyte, has fairly high charge and discharge capacity in particularly a baser potential region of 0 to 1 V due to such a charge and discharge reaction, and can be used as an excellent negative electrode active material, and they filed applications (Japanese Patent Application Nos. Hei 4-265179, 5-35851, 5-162958, and the like).

It has been found in the present invention that a secondary battery of about 1.5 V having a capacity larger than that of the conventional capacity can be realized by using lithium-containing silicon oxide represented by the compositional formula $Li_xSiO_y$, wherein $0 \leq x$ and $0 < y < 2$, as a negative electrode and also using lithium-containing titanium oxide or lithium-containing iron sulfide as a positive electrode. Since the lithium-containing silicon oxide has a greatly larger capacity for manganese oxide, a volume of the battery is not so increased even if conductive assistants are added in a relatively large amount. Therefore, inner resistance of the battery can be decreased, and the charge and discharge characteristics are improved.

SUMMARY OF THE INVENTION

Accordingly, an object of the present invention is to provide a non-aqueous electrolyte secondary battery comprising at least a negative electrode using lithium-containing silicon oxide as an active material, a positive electrode using lithium-containing titanium oxide or lithium-containing iron sulfide as an active material, and a non-aqueous electrolyte.

Another object of the present invention is to provide a method of producing the non-aqueous electrolyte secondary battery.

DETAILED DESCRIPTION OF THE PREFERRED EMBODIMENT

Figure 1:
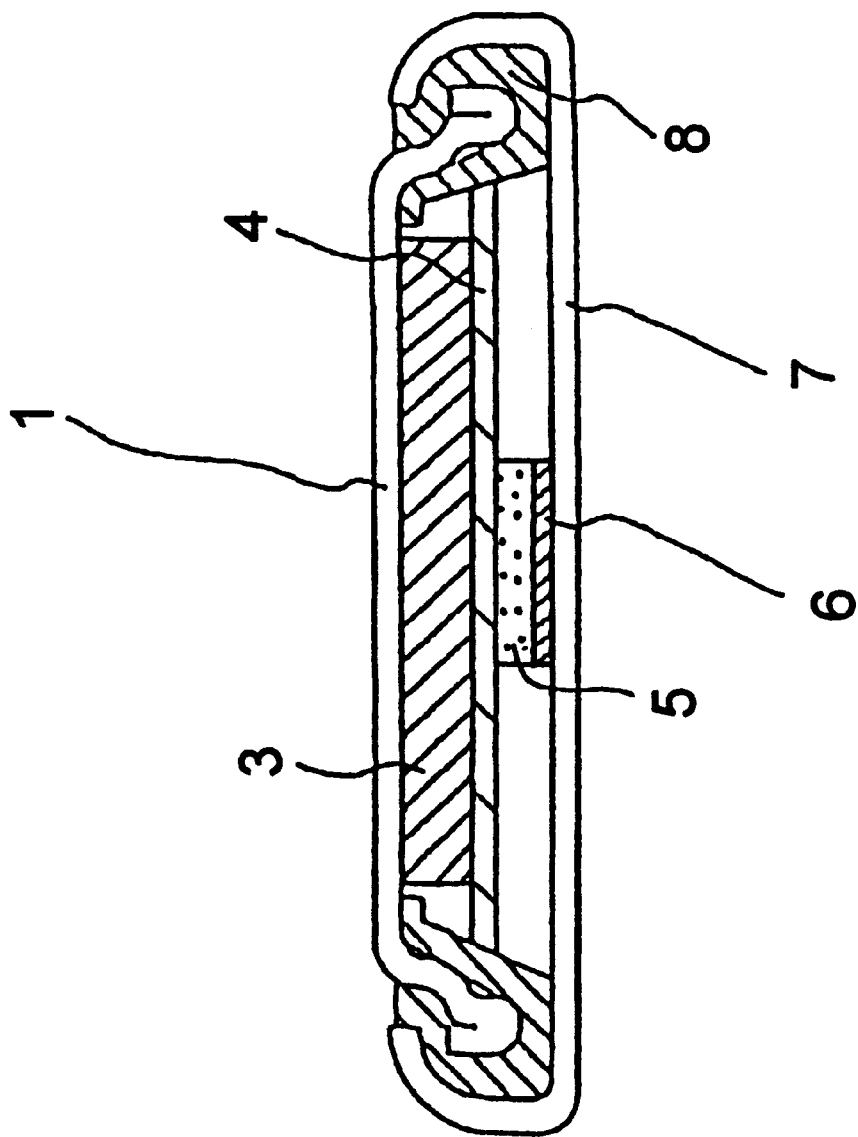
FIG. 1 is a cross sectional view showing one example of a structure of a test cell used in performance evaluation of an electrode active material.

A test cell constituted by a working electrode having lithium-containing silicon oxide $Li_xSiO_y$ which is used as a negative electrode active material of the present invention, a counter electrode comprising metallic lithium, and a non-aqueous electrolyte was charged and discharged to electrochemically absorb and release lithium ion in $Li_xSiO_y$, and the relationship among the lithium content x, potential in the working electrode, and polarization was examined. As a result, it has been found that the capacity capable of repeatedly charging and discharging stably, that is, the amount of lithium ion capable of electrochemically absorbing in and releasing from the oxide $Li_xSiO_y$, has a limitation, and polarization (inner resistance) of $Li_xSiO_y$ greatly changes by the lithium content x. In oxide $Li_xSiO_y$, although varying depending on the oxygen amount y, if x is larger than 4.5, polarization greatly increases, and it is difficult for the lithium ions to be absorbed any more at a practically large current density, resulting in precipitation and formation of dendrite on the electrode or a collector. It has been found that if the formation of dendrite is remarkable, the dendrite penetrates through a separator and reaches the counter electrode, resulting in inner short-circuit. It has also been found that even in discharging after charging, the polarization is still large even if x is less than 1.5. That is, although varying depending on the oxygen amount y, the lithium-containing silicon oxide $Li_xSiO_y$ has a small polarization (inner resistance) during charging and discharging when the lithium content x is in the range of $1.5 \leq x \leq 4.5$, has a low (base) potential, and has excellent charge and discharge characteristics as a negative electrode. In particular, in $2 \leq x \leq 3.9$, the potential is base, polarization is small, and efficiency (reversibility) of repeated charge and discharge is high. Therefore, the battery using this oxide as a negative electrode active material has a small inner resistance, and in particular, has excellent charge and discharge characteristics.

The present invention has been accomplished based on the above finding, and uses a material capable of absorbing and releasing lithium ions, comprising a lithium-containing silicon oxide represented by the compositional formula $Li_xSiO_y$ wherein the lithium content x and the oxygen amount y satisfy $1.5 \leq x \leq 4.5$ and $0 < y < 2$. That is, a composite oxide is used which is the silicon oxide containing lithium in its crystal structure or amorphous structure, and capable of absorbing and releasing lithium ions by an electrochemical reaction in a non-aqueous electorlyte, and which has a composition that x which is ratio of number of lithium atom to number of silicon atom is 1.5 or more and 4.0 or less, and y which is ratio of number of oxygen atom to number of silicon atom is more than 0 and less than 2. (It is confirmed that characteristics are not influenced even if x value varies about ±10%). It is preferred that the state of lithium in this composite oxide is mainly ion, but the state is not always limited thereto.

Preferred method of producing the lithium-containing silicon oxide $Li_xSiO_y$ (where $1.5 \leq x \leq 4.5$, and $0<y<2$) used as the negative electrode active material in the battery of the present invention includes the following two methods, but it is understood that the invention is not limited thereto.

A first method is that silicon and lithium as elements, or their compounds, are mixed in a predetermined molar ratio, and thereafter or while mixing the same, the resulting mixture was heat treated in a non-oxiding atmosphere such as inert atmosphere or vacuum, or in an atmosphere controlled with an oxygen amount for obtaining the predetermined oxidation number with respect to silicon and lithium, to thereby produce a composite oxide. The respective compounds of silicon and lithium to be starting materials may preferably be compounds, such as oxide or hydroxide of the respective elements, or salt such as carbonate or nitrate, or organic compounds and the like, which are capable of producing oxide of each element by heat treating the materials in a non-oxiding atmosphere. A method of mixing those starting materials, other than a method of directly dry-mixing the powders of each material, is to dissolve or disperse those materials in water, alcohol or the other solvent to be mixed or reacted uniformly in such a solution, and thereafter to dry them. Another method is to atomize or ionize those materials by heating or with electromagnetic wave or light or the like and simultaneously or alternatively to vaporize and deposit the same. In addition, other various kinds of methods are available. A temperature of the heat treatment which conducts after mixing those materials as above or while mixing those materials, differs depending on the starting materials or the heat treatment atmosphere, but it is possible to synthesize the oxide at a temperature of 400° C. or more, and preferably a temperature of 600° C. or more. On the other hand, since there is a case such that silicon and tetravalent silicon oxide are generated by disproportionation reactions at a temperature of 800° C. or more in an inert atmosphere or vacuum or the like. In such a case, the temperature is preferably 600 to 800° C.

Of the combinations of the starting materials, when, for the lithium supply material, using a lithium compound which forms lithium oxide by heat treatment, such as lithium oxide $Li_2O$, lithium hydroxide LiOH, salt such as $Li_2CO_3$ or $LiNO_3$, or a hydrate thereof or the like, and when, for the silicon supply source, using a simple substance silicon or silicon with a lower oxide $SiO_{y'}$ (where $0<y'<2$ is satisfied), then the composite oxide can be synthesized by heat treating the mixture of those in an inert atmosphere or an atmosphere such as a vacuum where oxygen is eliminated, which are particularly preferable for easier production and easier control of the oxygent amount or partial oxygen pressure in the heat treatment atmosphere.

Further, when using, for the silicon compound, various kinds of silicic acid containing hydrogen as the starting material, or when using lithium hydroxide or the like as the lithium compound, hydrogen is not completely eliminated by the heat treatment, and partially remains in the product even after the heat treatment. Thus it is possible for both lithium and hydrogen to be remained in the product, and this embodiment is included in the present invention. Further, together with lithium or its compound, or silicon or its compound, other alkali metals such as sodium, potassium, rubidium or the like, alkali earth metals such as magnesium, calcium or the like, and/or other metals or simple substances of non-metallic elements, such as iron, nickel, cobalt, manganese, vanadium, titanium, niobium, tungsten, molybdenum, copper, zinc, tin, lead, aluminum, indium, bismuth, gallium, gelmanium, carbon, boron, nitrogen, phosphorus or the like, or their compounds are added, and those are mixed and heat treated, thereby it is possible for metals other than lithium, or non-metals to be present together with lithium and silicon. Those embodiments are also included in the present invention.

The lithium-containing silicon oxide thus obtained can be used as a negative electrode active material as it is or, if necessary, after processing such as grinding and regulating grain size, granulation or the like. Further, as in a second method described hereinafter, by an electrochemical reaction of the lithium-containing silicon oxide with lithium or a material containing lithium, the lithium-containing silicon oxide may further be allowed to absorb lithium ions, or to the contrary, this composite oxide may be allowed to release lithium ions. Thus, materials wherein lithium content is increased or decreased may be used as the negative electrode active material.

The second method is a method that a lower oxide $SiO_y$ (wherein $2>y>0$ is satisfied) of silicon which does not contain lithium is previously synthesized, and by electrochemical reaction of the thus obtained lower oxide $SiO_y$ of silicon with lithium or material containing lithium, lithium ions are absorbed in the lower oxide $SiO_y$ of silicon to produce a lower oxide $Li_xSiO_y$ of silicon containing lithium. Such a lower oxide $SiO_y$ of silicon is compounds having stoichiometrical compositions such as $SiO_{1.5}(Si_2O_3)$, $SiO_{1.33}(Si_3O_4)$, SiO, $SiO_{0.5}(Si_2O)$ or the like, and also may be compounds having optional compositions wherein y is larger than 0 and less than 2. Further, those lower oxides $SiO_y$ of silicon can be produced by various conventional methods as mentioned below.

(1) A method of mixing silicon dioxide $SiO_2$ and silicon Si in the predetermined molar ratios and heating the resulting mixture in a non-oxidizing atmosphere or vacuum, (2) a method of heating silicon dioxide $SiO_2$ with a predetermined amount of carbon C to reduce the predetermined amount of silicon dioxide, (3) a method of mixing silicon dioxide $SiO_2$ with a predetermined amount of carbon C, a metal or the like, heating the resulting mixture, and reducing a predetermined amount of silicon dioxide, (4) a method of heating silicon Si with oxygen gas or oxide, heating the resulting mixture, and oxidizing a predetermined amount of silicon, (5) CVD method, plasma CVD method or the like of subjecting a mixed gas of silicon compound gas such as silane $SiH_4$ or the like and oxygen $O_2$ to thermal reaction or plasma decomposition reaction.

Further, the lower oxide $SiO_y$ of silicon can contain, together with silicon, alkali metals such as hydrogen, sodium, potassium, rubidium or the like, alkali earth metals such as magnesium, calcium or the like, and/or other metals or non-metallic elements such as iron, nickel, cobalt, manganese, vanadium, titanium, niobium, tungsten, molybdenum, copper, zinc, tin, lead, aluminum, indium, bismuth, gallium, gelmanium, carbon, boron, nitrogen, phosphorus or the like. This embodiment is included in the present invention.

Absorption of lithium ions in the lower oxide $SiO_y$ of silicon by electrochemical reaction can be performed within the battery after assembling the battery or inside or outside the battery in the course of the production process of the battery, and specifically can be performed as follows. Namely, (1) the lower oxide of silicon or a mixed agent of the same with a conductive agent and binder or the like is formed in a predetermined shape to obtain one side of an electrode (working electrode), and on the other hand, metal lithium or material containing lithium is used as another side of an electrode (counter electrode). Those electrodes are arranged opposing each other in contact with a non-aqueous electrolyte having lithium ion conductivity to constitute an electrochemical cell. A current application is performed with a suitable current in a direction to flow the working electrode to conduct a cathode reaction, thereby the lithium ions are electrochemically absorbed into the lower oxide of silicon. The working electrode obtained is used as a negative electrode as it is, or used as a negative electrode active material constituting the negative electrode to produce the non-aqueous electrolyte secondary battery. (2) The lower oxide of silicon or a mixed agent of the same with a conductive agent and a binder is formed into a predetermined shape, to which lithium or material alloy or the like is press fitted or contact bonded to produce a laminate electrode, which is used as a negative electrode and assembled into the non-aqueous electrolyte secondary battery. By contacting the laminate electrode with the electrolyte within the battery, a kind of local cell is formed to self-discharge, and lithium is thus electrochemically absorbed in the lower oxide of silicon. (3) A non-aqueous electrolyte secondary battery is constituted in that the lower oxide of silicon is used as a negative electrode active material, a material containing lithium and capable of absorbing and releasing lithium ions is used as a positive electrode active material. Thus, lithium ions released from the positive electrode by charging while being used as a battery are absorbed in the lower oxide of silicon.

Materials which absorb lithium in the silicon oxide of the present invention include lithium metal, lithium alloy, calcined carbonaceous compounds capable of absorbing and releasing lithium ion or lithium metal, and the like.

The silicon oxide or lithium-containing silicon oxide has a particle size of preferably 500 $\mu$m or less, more preferably 100 $\mu$m or less, and most preferably 50 to 0.1 $\mu$m. A specific surface area of the particle is preferably 0.05 to 100 $m^2/g$, more preferably 0.1 to 50 $m^2/g$, and most preferably 0.1 to 30 $m^2/g$.

The lithium-containing silicon oxide $Li_xSiO_y$ thus obtained is used as a negative electrode active material.

A lithium-containing titanium oxide used as a positive electrode active material of the present invention is obtained by mixing a lithium compound and titanium oxide and heat treating the resulting mixture. It has been clarified that if the lithium-containing titanium oxide is used as a positive electrode active material of a lithium secondary battery, doping/undoping of lithium are easy, and excellent effect is exhibited to the improvement of charge and discharge cycle life of the battery. Where anatase-type titanium oxide is used, which is conventionally investigated, the initial capacity is 200 mAh/g, but the capacity greatly deteriorates if charge and discharge cycle is repeated, and the capacity is substantially lost after several of tens cycles.

On the other hand, the lithium-containing titanium oxide of the present invention has an electrode potential of about 1.5 V, and although the initial capacity is poorer than that of anatase-type titanium oxide, deterioration of cycle life does not substantially occur. The reason for this is considered to be due to difference in crystal structure. Doping/undoping of lithium ions are easy in lithium-containing titanium oxide as compared with anatase-type titanium oxide, and it is assumed that the lithium-containing titanium oxide constitutes crystal structure which is difficult to be broken by the doping/undoping. The lithium-containing titanium oxide is represented by the chemical formula $Li_xTi_yO_4$, and the oxides wherein the stiochiometric numbers are $0.8 \leq x \leq 1.4$ and $1.6 \leq y \leq 2.2$ are preferable. The representative example of the lithium-containing titanium oxide is $LiTi_2O_4$, and also includes $Li_{1.33}Ti_{1.66}O_4$, $Li_{0.8}Ti_{2.2}O_4$, or the like.

Further, this lithium-containing titanium oxide is obtained by mixing lithium compound such as lithium hydroxide or the like and titanium oxide (anatase), and calcining the resulting mixture at 500 to 1,000° C. It has been ascertained by X-ray diffraction that the oxide has a structure of titanium oxide (anatase) at a temperature of less than 500° C., but has a structure due to $Li_xTi_yO_4$ at 500 to 1,000° C. It has been ascertained that if the mixture is calcined by further rising a temperature to 1,000° C. and more, the structure is changed. The calcination temperature is preferably 700 to 950° C.

Further, together with lithium or its compound, or titanium or its compound, other alkali metals such as sodium, potassium, rubidium or the like, alkali earth metals such as magnesium, calcium or the like, and/or other metals or simple substances of non-metallic elements, such as iron, nickel, cobalt, manganese, vanadium, titanium, niobium, tungsten, molybdenum, copper, zinc, tin, read, aluminum, indium, bismuth, gallium, gelmanium, carbon, boron, nitrogen, phosphorus or the like, or their compounds are added, and those are mixed and heat treated, thereby it is possible for metals other than lithium, or non-metals to be present together with lithium and titanium. Those embodiments are included in the present invention.

Even in a positive electrode of a non-aqueous electrolyte secondary battery using this lithium-containing titanium oxide, doping and undoping of lithium ions are conducted similar to the negative electrode. Therefore, the amount of lithium in the lithium-containing titanium oxide (general formula: $Li_xTi_yO_4$) in the state of use changes in the range of $0 \leq x \leq 3$. If x exceeds 3, lithium metal tends to precipitate on the titanium surface, or crystals of the lithium-containing titanium oxide are broken, so that battery characteristics tend to deteriorate.

The negative electrode of the present invention using as the active material the lithium-containing silicon oxide $Li_xSiO_y$ wherein the lithium content x and the oxygen amount y are regulated so as to satisfy $1.5 \leq x \leq 4.5$ and $0 < y < 2$ facilitates absorption and release of lithium ions in or from the oxide $Li_xSiO_y$ due to charge and discharge in the non-aqueous electrolyte, making polarization small, and as a result, large current charge and discharge characteristics are greatly improved. Further, since there are no precipitation of lithium dendrite on the negative electrode or the collector, formation of irreversible reaction product, and the like during charge and discharge, repeating efficiency (reversibility) of charge and discharge is high, and defect such as inner short-circuit or the like does not occur. Furthermore, the potential is base (1.5 V or less to metal lithium), and the non-aqueous electrolyte secondary battery of high energy density is obtained. Therefore, by combining the negative electrode with the positive electrode of the lithium-containing titanium oxide having a voltage of about 1.5 V, a secondary battery of about 1.5 V is provided.

It has also been found in the present invention that a 1.5 V secondary battery can be constituted by combining the lithium-containing iron sulfide as the positive electrode with the negative electrode using the lithium-containing silicon oxide as the active material.

Sulfide of iron is a material which has been investigated as a battery active material, but it is not put into practical use as a 1.5 V secondary battery. This is considered to be that there is the problem in that the characteristics thereof greatly vary depending on the use manner.

FIG. 1 is a cross-sectional view showing one example of a test cell used for evaluating charge and discharge characteristics of an active material of a non-aqueous electrolyte secondary battery according to the present invention. In the drawing, numeral 1 is a counter electrode case simultaneously used as a counter electrode terminal and is comprised of a plate made of stainless steel, whose outer side surface is Ni-plated, which is subjected to drawing. 3 is a counter electrode which is produced such that a predetermined thickness of lithium foil is punched with a diameter of 14 mm and fixed on the inner side surface of the counter electrode case 1. 7 is a working electrode case made of stainless steel whose outer side surface is Ni-plated, and which is also used as a working electrode terminal. 5 is a working electrode formed of an active material according to the present invention described later. 6 is a working electrode collector made of a conductive adhesive using carbon as a conductive filler, and is electrically connected with the working electrode 5 and the working electrode case 7 each of which is adhered together. 4 is a separator made of a porous film of a polypropylene and is impregnated with an electrolyte solution. 8 is a gasket mainly made of a polypropylene, which is placed between the counter electrode case 1 and the working electrode case 7, maintaining an electrical insulation between the counter electrode and the working electrode. Simultaneously, the cell contents are sealed by means of the working electrode case opening edge being bent and caulked inside. An electrolyte is prepared such that one mol/liter of lithium phosphorus hexafluoride $LiPF_6$ is dissolved in a mixed solvent of ethylene carbonate and ethyl methyl carbonate in 1:1 volume ratio. The cell has an outer diameter of 20 mm with a thickness of 1.6 mm.

The working electrode 5 is produced as follows. Commercially available FeS which was ground with an automatic mortar and size-controlled was used as an active material of the working electrode. With this active material, graphite as a conductive agent and polyvinylidene fluoride as a binder were mixed in the weight ratio of 45:45:10, respectively, to produce a working electrode mixture. Next, this working electrode mixture was press-molded into a pellet having a diameter of 4.05 mm with a thickness of 0.3 mm by 2 ton/cm² to produce the working electrode 5. Thereafter, the obtained working electrode 5 was adhered on the working electrode case 7 using the working electrode collector 6 made of conductive resin adhesive using carbon as a conductive filler, to form a unitary body, and the unitary body is vacuum-heated and dried at 100° C. for 8 hours. The resulting body was used to produce the test cell described above.

Figure 2:
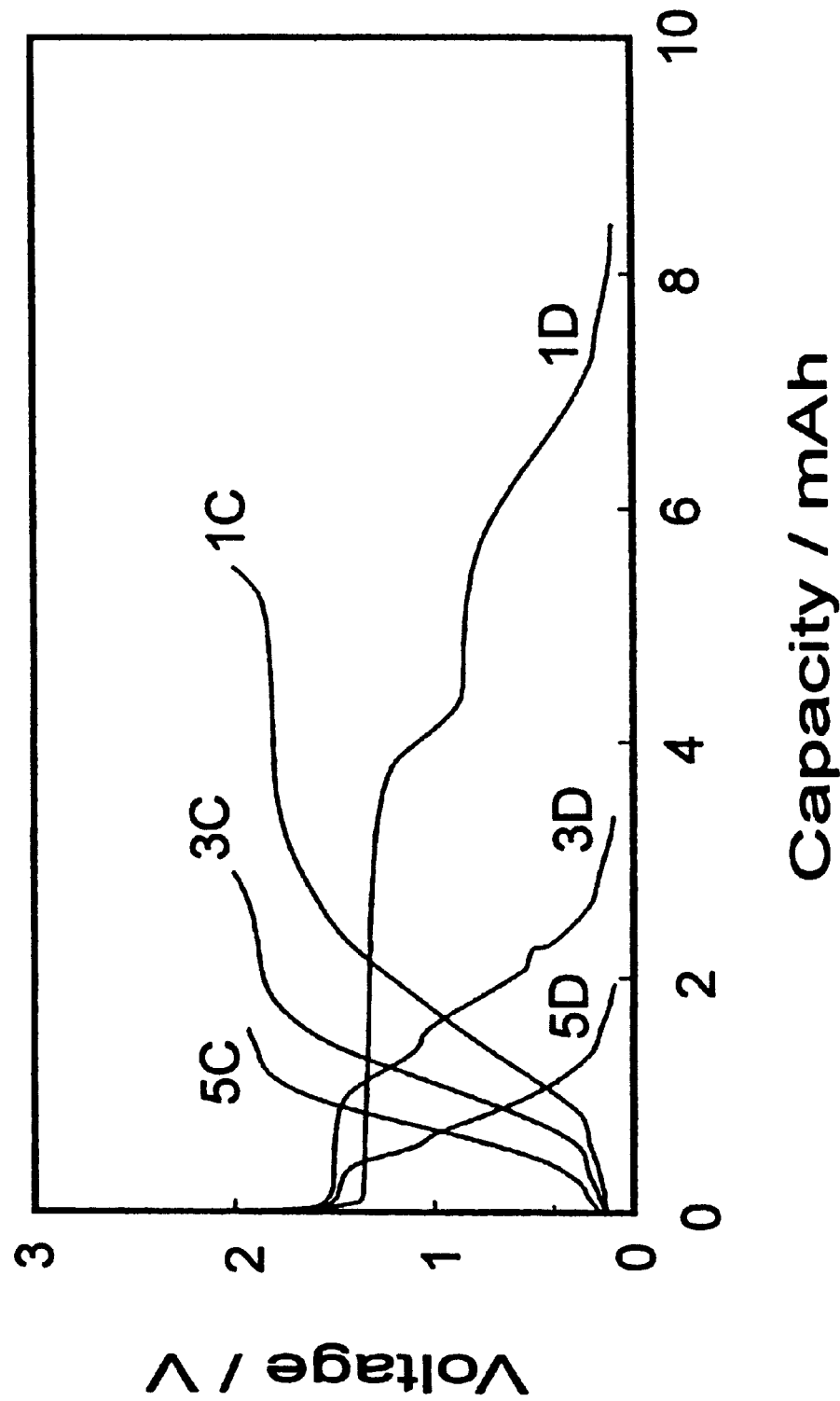
FIG. 2 is a graph showing cycle characteristics when a test cell produced is subjected to charge and discharge cycle under the condition of a constant current of 0.1 mA with a final voltage of 0 V of discharging (D) and a final voltage of 2.5 V of charging (C)

The test cell thus produced was tested of charge and discharge as follows. A charging and discharging cycle was performed under the conditions of a constant current of 1 mA with a final voltage of 0 V of discharging (D) and a final voltage of 2.5 V of charging (C). The cycle characteristics are shown in FIG. 2. In the drawing, D1 is a first discharging, D2 is a second discharging, Dn is n'th discharging, and Cn is n'th charging.

It is apparent from FIG. 2 that the capacity is decreased from the first discharge (D1). This is assumed that structure change of FeS occurs on a flat portion of the second stage in the charging curve of D1, and decrease in the capacity occurs. That is, if lithium ions are excessively absorbed in FeS, FeS structure is broken, making it impossible to perform charging and discharging.

Figure 3:
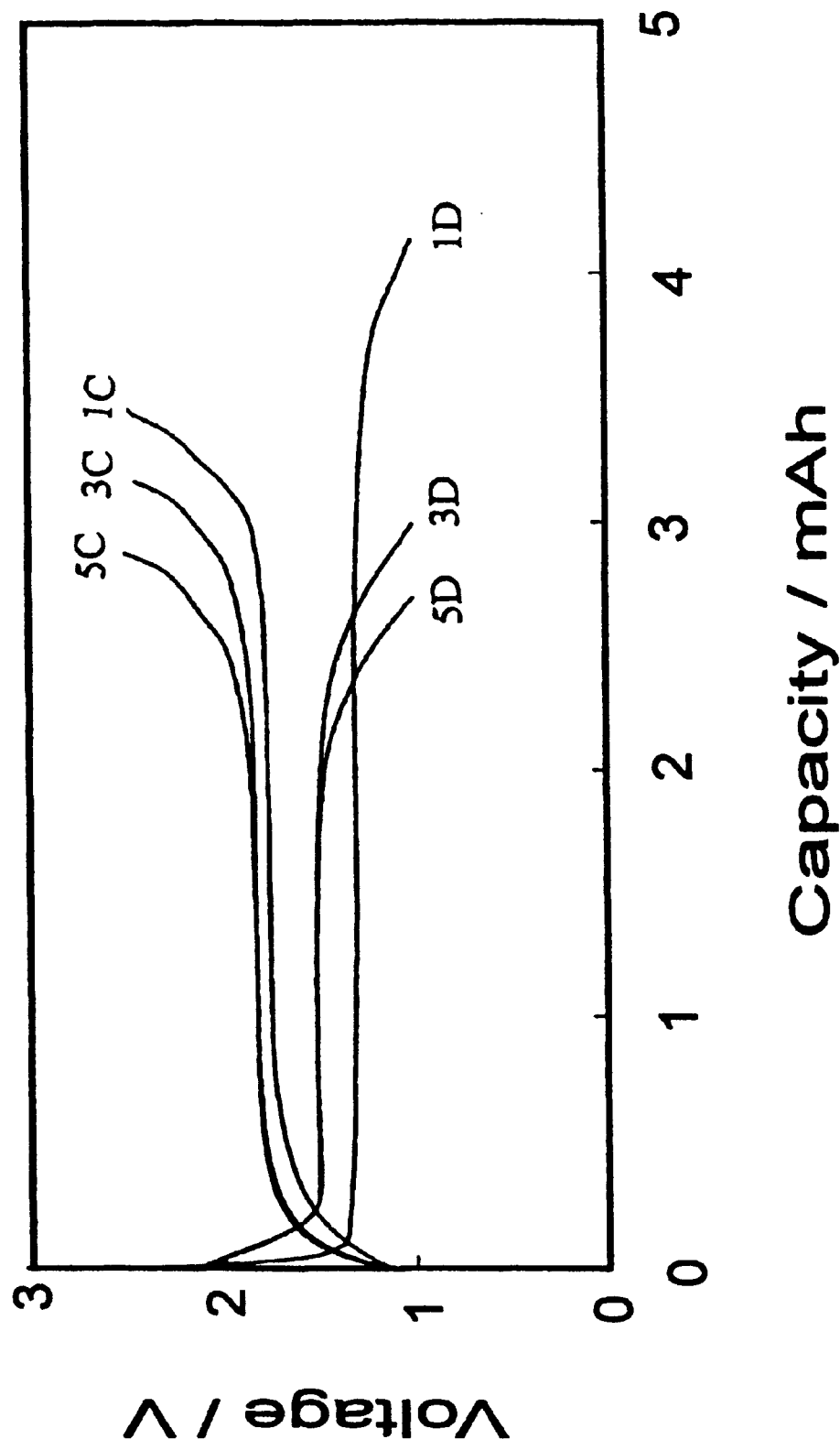
FIG. 3 is a graph showing cycle characteristics when a test cell produced is subjected to charge and discharge cycle under the condition of a constant current of 0.1 mA with a final voltage of 1.0 V of discharging (D) and a final voltage of 2.5 V of charging (C)

Therefore, the same type of the test cell was tested of the charge and discharge cycle under the condition of a constant current of 0.1 mA with a final voltage of 1.0 V of discharging (D) and a final voltage of 2.5 V of charging (C). The cycle characteristics where lithium ions are not absorbed up to the flat portion of the second stage are shown in FIG. 3. It is apparent from FIG. 3 that as compared with FIG. 2, the capacity is large and deterioration is decreased. From those results, unless a battery is designed considering the lithium amount which does not decrease the potential of FeS to 1 V or less, that is, the lithium amount is 1.1 moles or less per mole of FeS, the characteristics of FeS will be sacrificed. Further, Comparing 1D and 3D in FIG. 3, there is about 1 mAh difference. This is due to the presence of lithium which does not participate in the remaining charging and discharging in the crystal of FeS. Therefore, unless lithium is retained in an amount of 0.25 moles or more per mole of FeS, charging and discharging cannot be performed. Further, due to the fact that FeS is generally liable to cause Fe defect, or scatter on production, the amount of S to Fe can vary within the range of about ±30%, but FeS can be used as the active material without any problem. That is, it is important that sulfide of ion containing lithium represented by the composition formula $Li_xFeS_y$, and the lithium content x and the oxygen amount y are satisfied with $0.25 \leq x \leq 1.1$ and $0.7 < y < 1.3$.

It has been found in the present invention that the capacity can be markedly increased by using sulfide of iron containing lithium having a large capacity as the battery active material of a battery of about 1.5 V. In particular, the capacity increase is remarkable by using the lithium-containing silicon oxide represented by the compositional formula $Li_xSiO_y$ (wherein $0 \leq x$ and $0 < y < 2$) which was filed as a patent application by the present inventors, as the negative electrode and using FeS as the positive electrode.

The average particle size of the positive electrode active material used in the present invention is preferably 500 μm or less, more preferably 100 μm or less, and most preferably 50 to 0.1 μm. The form of the active material is preferably primary particle aggregates having an average particle size of 1 to 20 microns made of primary particles having an average particle size of 0.1 to 2.5 microns. The active material is more preferably primary particle aggregates having an average particle size of 3.5 to 9.5 microns made of primary particles having an average particle size of 0.1 to 2.5 microns. Further, it is preferred in the above primary particle aggregates that the primary particle aggregates having an average particle size of 1 to 15 microns constitutes 80% or more, more preferably 85% or more, and most preferably 90% or more, of the total volume. The specific surface area of the primary particle aggregates is preferably 0.05 to 100 m²/g, more preferably 0.1 to 50 m²/g, and most preferably 0.1 to 30 m²/g.

The electrode shape can be various shapes such as plate-like, film-like, or columnar shape, or an electrode-on-metal foil to serve the purpose of use. When the battery shape is coin or button, the mixture for the positive electrode active material or the negative electrode active material is pressed into a pellet shape which is mainly used. Further, when the battery shape is a thin coin or button, an electrode molded into a sheet form may be punched, and used. The thickness and diameter of the pellet are determined by the size of battery.

Further, when the shape of the battery is sheet, cylinder or rectangle, the mixture for the positive electrode active material or the negative electrode active material is mainly used by coating on the collector, drying and compressing the same. The coating thickness, length and width are determined by the size of the battery, but the coating thickness is preferably 1 to 2,000 μm in the state of being compressed after drying.

A press method for forming into pellets or sheet can use methods generally employed, but mold press method or calender press method is preferred. Press pressure is not particularly limited, but a pressure of 0.2 to 3 t/cm$^2$ is preferred. Press speed of the calender press method is preferably 0.1 to 50 m/min. Press temperature is preferably room temperature to 200° C.

A conductive agent, a binder or filler can be added to the electrode mixture.

The type of the conductive agent is not particularly limited, and metal powder may be used. However, a carbon type material is particularly preferred. Carbon materials are most general. Natural graphites (scaly graphite, scaly piece graphite, earth-like graphite, or the like), synthetic graphites, carbon blacks, channel blacks, thermal blacks, furnace blacks, acetylene blacks, carbon fibers, and the like are used. Further, for metals, metal powder such as copper, nickel, silver or the like, and metal fibers are used. Conductive polymers are also used.

The amount of carbon added is not particularly limited since the mixing ratio varies depending on conductivity of the active material, the electrode shape, or the like, but the amount thereof is preferably 1 to 50% by weight, and more preferably 2 to 40% by weight, for the negative electrode. It is necessary for the positive electrode of the present invention to decrease resistance as low as possible, and hence the amount of carbon added is preferably 7 to 50% by weight, and more preferably 9 to 40% by weight.

Particle size of carbon is in the range of 0.5 to 50 μm, preferably 0.5 to 15 μm, and more preferably 0.5 to 6 μm in average particle size. As a result, contact between the active materials becomes good, so that network formation of electron conduction is improved, and active materials which do not contribute to electrochemical reaction are decreased.

The binder is not particularly limited although materials which are insoluble in the electrolytic solution are preferred.

Examples of the binder which can be generally used include polysaccharides, thermosetting resins, polymers having rubber elasticity, and the like, such as polyacrylic acid, polyacrylic acid neutralized product, polyvinyl alcohol, carboxymethyl cellulose, starch, hydroxypropyl cellulose, regenerated cellulose, diacetyl cellulose, polyvinyl chloride, polyvinyl pyrrolidone, tetrafluoroethylene, polyvinylidene fluoride, polyethylene, polypropylene, ethylene-propylenediene polymer (EPDM), sulfonated EPDM, styrene butadiene rubber, polybutadiene, fluorine rubber, polyoxyethylene oxide, polyimide, epoxy resin, phenolic resin or the like. Those are used alone or as mixtures of two or more thereof. The amount of the binder added is not particularly limited, but is preferably 1 to 50% by weight.

The filler can be any fibrous materials so long as they do not undergo chemical change in the constituted battery. In general, olefinic polymers such as polypropylene, polyethylene or the like, and fibers of glass, carbon or the like are used. The amount of the filler added is not particularly limited, but is preferably 0 to 30% by weight.

The electrolytic solution is not particularly limited, and organic solvents used in the conventional non-aqueous secondary battery are used. The organic solvents used are cyclic esters, chain esters, cyclic ethers, chain ethers, and the like. Specific example of the organic solvent preferably used include propylene carbonate (PC), ethylene carbonate (EC), butylene carbonate (BC), vinylene carbonate, dimethyl carbonate (DMC), diethyl carbonate (DEC), γ-butyrolactone (BL), 2-methyl-γ-butyrolactone, acetyl-γ-butyrolactone, γ-valerolactone, 1,2-dimethoxyethane (DME), 1,2-ethoxyethane, diethylether, ethylene glycol dialkyl ether, diethylene glycol dialkyl ether, triethylene glycol dialkyl ether, tetraethylene glycol dialkyl ether, dipropyl carbonate, methyl ethyl carbonate, methyl butyl carbonate, methyl propyl carbonate, ethyl butyl carbonate, ethyl propyl carbonate, butyl propyl carbonate, propionic acid alkyl ester, malonic acid dialkyl ester, acetic acid alkyl ester, tetrahydrofuran (THF), alkyl tetrahydrofuran, dialkyl alkyltetrahydrofuran, alkoxytetrahydrofuran, dialkyoxytetrahydrofuran, 1,3-dioxolane, alkyl-1,3-dioxolane, 1,4-dioxolane, 2-methyl tetrahydrofuran, dimethylsulfoxide, 1,3-dioxolane, formamide, dimethyl formamide, dioxolane, acetonitrile, nitromethane, methyl formate, methyl acetate, methyl propionate, ethyl propionate, phosphoric acid triester or the like, or their derivatives or mixtures.

From the standpoint of suppressing reduction decomposition reaction of the solvent, if the electrolytic solution having carbon dioxide gas ($CO_2$) dissolved therein is used, it is effective to increase the capacity and cycle life.

Main impurities present in the mixed solvent (non-aqueous solvent) are, for example, water, organic peroxides (e.g., glycols, alcohols, carboxylic acids, or the like), and the like. It is believed that each of those impurities forms an insulating coating on the surface of graphitized product, and interfacial resistance of the electrode is increased. Therefore, the impurities may affect decrease in the cycle life or capacity. Further, self-discharge during storage at high temperature (60 C. or more) may increase. For those reasons, it is preferred that the impurities are decreased as much as possible in the electrolytic solution containing non-aqueous solvent. Specifically, it is preferred that the amount of water is 50 ppm or less and the amount of organic peroxide is 1,000 ppm or less.

The support salt which can be used is lithium salts (electrolyte) such as lithium perchlorate ($LiClO_4$), lithium phosphorus hexafluoride ($LiPF_6$), Boron lithium fluoride ($LiBF_4$), lithium arsenic hexafluoride ($LiAsF_6$), lithium trifluoromethanesulfonate ($LiCF_3SO_3$), lithiumbistrifluoromethylsulfonylimide [$LiN(CF_3SO_2)_2$], thiocyan salt, aluminum fluoride or the like. Those salts can be used alone or mixtures of two or more thereof. It is desirable that the dissolution amount of the salt to the non-aqueous solvent is 0.5 to 3.0 mol/liter.

Further, besides the electrolytic solution, the following solid electrolytes can be used. The solid electrolyte is classified into inorganic solid electrolyte and organic solid electrolyte. Nitrides, halides, oxygen acid salts, and the like, of Li are known as the inorganic solid electrolyte. For the organic solid electrolyte, polyethylene oxide derivatives or polymers containing the derivatives, polypropylene oxide derivatives or polymers containing the derivatives, phosphoric acid ester polymers, and the like are effective. A method of using the inorganic and organic solid electrolytes in combination is known.

For the purpose of improving the charge or discharge characteristics, additives may be added. The additives may be directly added to the active material, but a method of adding to the electrolytic solution is most general. The additives include toluene, pyridine, and the like.

For making the electrolytic solution incombustible, the electrolytic solution can contain halogen-containing solvents such as carbon tetrachloride, chloroethylene trifluoride or the like.

Further, the mixture for the positive electrode or the negative electrode can contain the electrolytic solution or the electrolyte. For example, a method of containing the above-described ion conductive polymer or nitromethane (JP-A-48-36633) or electrolytic solution (JP-A-57-124870) is known.

The collector of the electrode active material is preferably a metal plate or a metal foil, having small electric resistance. For example, for the positive electrode, stainless steel, nickel, aluminum, titanium, tungsten, gold, platinum, calcined carbon, or the like is used as the material of the collector. Besides those, aluminum or stainless steel, whose surface is treated with carbon, nickel, titanium or silver, is also used. Of the stainless steel, a two phase stainless steel is effective against corrosion. In the case of coin or button battery, nickel is plated on the side which becomes the outer side of the battery. The treatment method includes wet plating, dry plating, CVD, PVD, cladding by press adhering, coating, and the like.

For the negative electrode, stainless steel, nickel, copper, titanium, aluminum, tungsten, gold, platinum, calcined carbon, or the like is used as the material thereof. Besides those, copper or stainless steel, whose surface is treated with carbon, nickel, titanium or silver, Al-Cd alloy, and the like are also used. The treatment method includes wet plating, dry plating, CVD, PVD, cladding by press adhering, coating, and the like.

The surface of those materials may be oxidized. Rust proofing treatment may often be conducted using benzotriazole, triazine thiol, alkyl thiol, fluorine type water proof agent, silicone type water proof agent or the like. The shape of the negative electrode is foil, a case of coin button battery, film, sheet, net, or the like. Punched product, lath material, porous material, foamed product, molding of fibers, or the like may also be used. The thickness of the negative electrode is not particularly limited. In the case of a case of coin button battery, terminals for mounting on a substrate may be provided by resistance welding, laser welding, or the like. Material for the terminal includes stainless steel, stainless nickel clad material, stainless steel plated with nickel or gold, and the like. Thus, the material is not particularly limited so long as it is a metal.

The separator is a porous material which does not have electron conductivity having open pore and a durability against the electrolytic solution or the electrode active material, and the like. In general, non-woven fabric, porous material or cloth, comprising glass fibers, polyethylene, polypropylene or the like are used. The pore size of the separator is in a range generally used for the battery. For example, the pore size is 0.01 to 10 $\mu$m. The thickness of the separator is in a range generally used for the battery, and is, for example, 5 to 300 $\mu$m. The separator is fixed in the battery case so as not to cause the practical problem. Further, as a countermeasure for safety, it is effective to use a separator wherein ion permeability is changed by temperature.

It is possible to fix the electrode active material and the collector with a conductive adhesive. The conductive adhesive used is an adhesive obtained by dissolving a resin in a solvent and adding powder or fiber of carbon or metal thereto, an adhesive obtained by dissolving conductive polymer in the dissolved resin, or the like.

Where the electrode is a pellet-like electrode, the conductive adhesive is coated between the collector and the electrode pellet to fix them. In the conductive adhesive in such a case, a thermosetting resin is often contained. Where the electrode is a sheet-like electrode, the conductive adhesive is used for the purpose of electrically connecting the collector and the electrode, rather than physically adhering those.

In the case using a coin or button battery, polypropylene, polyethylene, polyamide resin, various engineering plastics, or the like are used as a gasket. Generally, the gasket made of the polypropylene is general, but in order to correspond to reflow temperature in mounting the battery on the substrate, a material such as engineering plastics having high heat resistance temperature, or the like may be used.

In the case of a coin or button battery, a sealing agent of one or a mixture selected from asphalt pitch, butyl rubber, fluorine type oil, chlorosulfonated polyethylene, epoxy resin, and the like is used between the gasket and positive and negative electrode cases. When the sealing agent is transparent, the sealing agent is colored to thereby clarify whether or not the sealing agent is coated. The coating method of the sealing agent is pouring of the sealing agent into the gasket, coating on the positive and negative electrode, dipping the gasket in the sealing agent solution, or the like.

The shape of the battery can be any of coin, button, sheet, cylinder, rectangle, or the like.

The purpose of use of the non-aqueous electrolyte secondary battery of the present invention is not particularly limited, and includes backup power supplies for portable telephone, pager or the like, power supplies for watch having powder generation function, and the like.

It is desirable that the battery of the present invention is assembled in a moisture-free atmosphere or an inert gas atmosphere. Further, it is preferable that parts before assembling are previously dried. As drying or moisture-eliminating method of pellet, sheet and other parts, the methods generally used can be employed. In particular, it is preferred to use hot air, vacuum, infrared ray, far infrared ray, electrom beam, and low moisture air. Those are used alone or in combination of two or more thereof. The temperature is preferably in the range of 80 to 350° C., and more preferably 100 to 250° C. The moisture content is preferably 2,000 ppm or less as the entire battery, and it is preferred for the positive electrode mixture, the negative electrode mixture or the electrolyte to be 50 ppm or less from the point of cycle property.

The present invention is described in more detail by reference to the following embodiments, but it should be understood that the invention is not construed as being limited thereto.

EMBODIMENT 1-1

Figure 4:
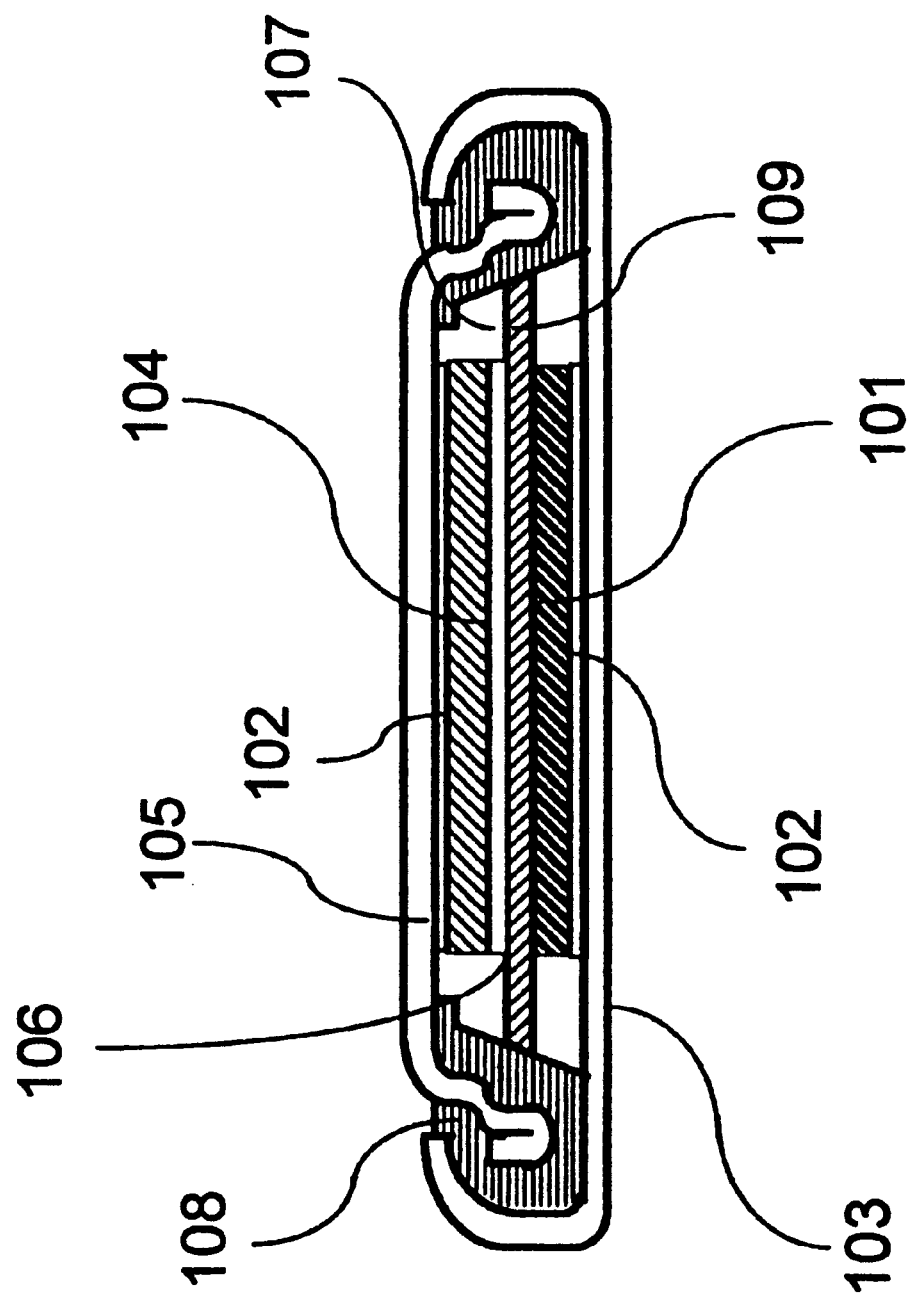
FIG. 4 is a cross sectional view showing a coin type lithium secondary battery.

This embodiment is an embodiment where $Li_{1.33}Ti_{1.66}O_4$ was used as the positive electrode active material, and SiO was used as the negative electrode active material. A cross sectional view of the battery is shown in FIG. 4. Further, the size of the battery is that the outer diameter is 6.8 mm and the thickness is 2.1 mm.

The positive electrode was produced as follows.

Anatase type titanium dioxide and lithium hydroxide were mixed in the titanium/lithium atomic ratio of 4:3, and the resulting mixture was calcined at 850° C. for 12 hours. As a result of analyzing a structure of the resulting product with X ray diffraction, it was found that the product substantially was $Li_{1.33}Ti_{1.66}O_4$ of a spinel structure. (ASTM Card No. 26-1198) This $Li_{1.33}Ti_{1.66}O_4$ was used as the active material. This active material was ground. Graphite as the conducting agent, and crosslinking type acrylic acid resin and a fluororesin, as the binder were mixed with the powdered active material such that the proportions of the active material, graphite, acrylic acid and fluororesin were 82:10:7:1 in weight ratio to prepare a positive electrode mixture. This positive electrode mixture was molded under a pressure of 2 ton/cm² into a pellet having a diameter of 4.05 mm and a thickness of 1.1 mm. The pellet had a weight of 28.6 mg. The positive electrode pellet 101 thus obtained was then adhered to a positive electrode case 103 using an electrode collector 102 comprising an conductive resin adhesive using carbon as a conductive filler to prepare a united body, and the united body was dried through heating at 150° C. for 8 hours under reduced pressure.

The negative electrode was produced as follows. Commercially available silicon monoxide (SiO) was ground with an automatic mortar, and the particle size of the particles was adjusted to have 44 μm or less. The resulting powder was used as the active material for the working electrode. Graphite as the conducting agent and polyvinylidene fluoride as the binder were mixed with the active material such that the proportions of the active material, graphite and polyvinylidene fluoride were 45:45:10 in weight ratio to prepare a negative electrode mixture. This mixture was molded under a pressure of 2 ton/cm² into a pellet having a diameter of 4.05 mm and a thickness of 0.23 mm. The pellet had a weight of 5.5 mg. The negative electrode pellet 104 thus obtained was then adhered to a negative electrode case 105 using an electrode collector 102 comprising a conductive resin adhesive using carbon as a conductive filler to prepare a united body. This united body was dried through heating at 100° C. for 8 hours under reduced pressure. Further, a lithium foil 106 obtained by punching in a diameter of 4 mm and a thickness of 0.2 mm was press adhered on the pellet to produce a lithium-negative electrode pellet laminate electrode.

An electrolytic solution 107 used was a solution prepared by dissolving 1 mol/l of $LiClO_4$ in a mixed solvent of propylene carbonate, ethylene carbonate and ethyl methyl carbonate in the volume ratio of 1:1:2.

Figure 5:
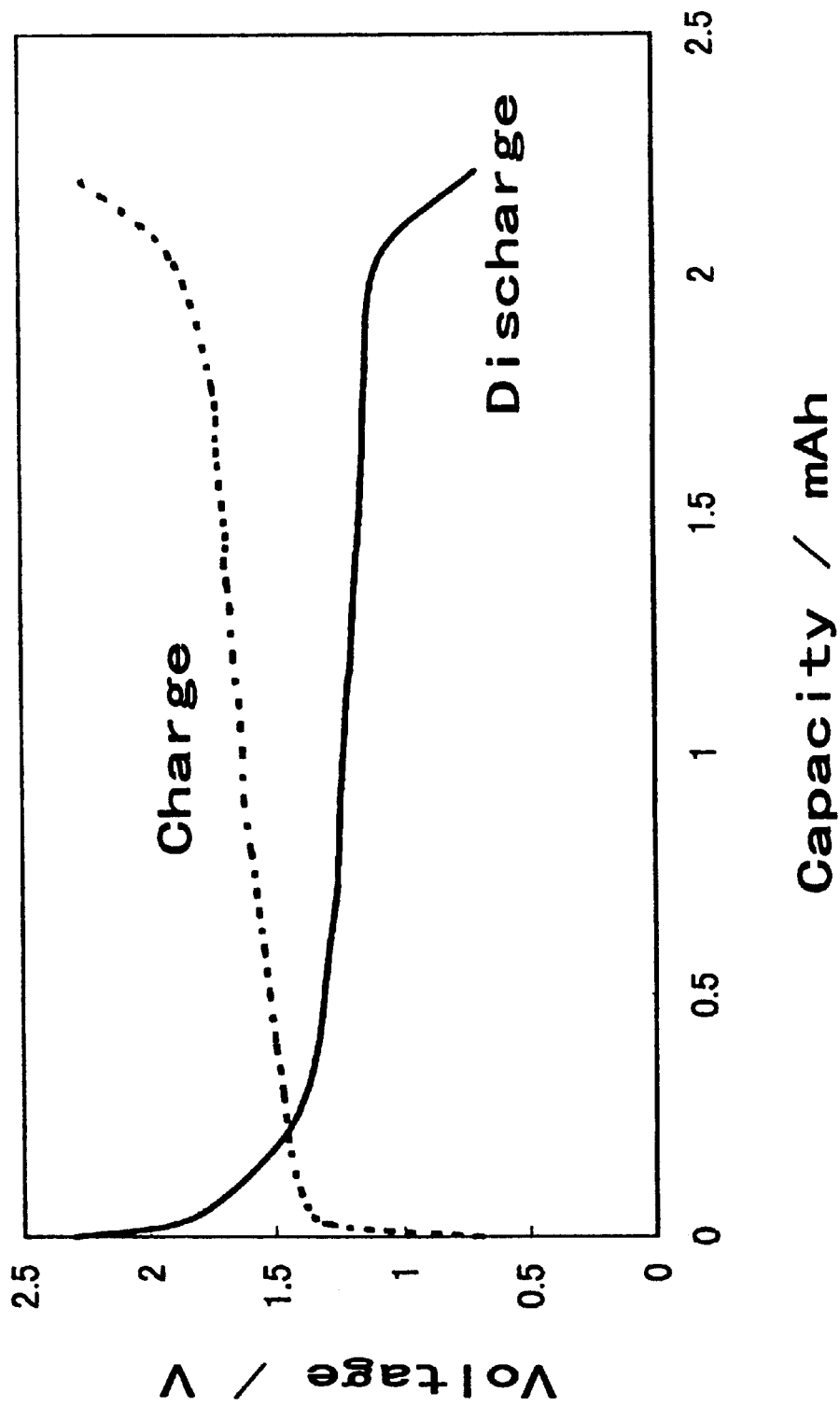
FIG. 5 is a graph showing charge and discharge characteristics of the lithium secondary battery of the present invention using $Li_{1.33}Ti_{1.66}O_4$ as a positive electrode active material and SiO as negative electrode active material.

The battery thus produced was subjected to a charge and discharge cycle under the condition of a constant current of 50 μA with a final voltage of 0.7 V of discharging and a constant current of 50 μA with a final voltage of 2.3 V for charging. Charge and discharge characteristics in this case are shown in FIG. 5.

Further, the battery after 100 cycles was disassembled (in moisture-free atmosphere) under charging state and also discharging state, and the positive electrode active material thereof was subjected to X ray diffraction. As a result, it showed X ray chart having a diffraction peak at substantially the same position as that of $Li_{1.33}Ti_{1.66}O_4$ in either stage.

EMBODIMENT 1-2

This embodiment is an embodiment where $LiTi_2O_4$ was used as the positive electrode active material, and SiO was used as the negative electrode active material. Positive electrode, negative electrode and electrolytic solution produced as described below were used. Further, the size of the battery is that the outer diameter is 6.8 mm and the thickness is 2.1 mm. The commercially available $LiTi_2O_4$ was ground and used as a positive electrode. Graphite as the conducting agent, and crosslinking type acrylic acid resin and a fluorine resin, as the binder were mixed with the powdered $LiTi_2O_4$ such that the proportions of the powdered $LiTi_2O_4$, graphite, acrylic acid and fluororesin were 82:10:7:1 in weight ratio to prepare a positive electrode mixture. This positive electrode mixture was molded under a pressure of 2 ton/cm² into a pellet having a diameter of 4.05 mm and a thickness of 1.1 mm. The pellet had a weight of 27.0 mg. The positive electrode pellet 101 thus obtained was adhered to a positive electrode case 103 using an electrode collector 102 comprising an conductive resin adhesive using carbon as a conductive filler to prepare a united body, and the united body was dried through heating at 150° C. for 8 hours under reduced pressure.

The negative electrode was produced as follows. Commercially available silicon monoxide (SiO) was ground with an automatic mortar, and the particle size thereof was adjusted to have 44 μm or less. The resulting powder was used as the active material for the working electrode. Graphite as the conductive agent and polyvinylidene fluoride as the binder were mixed with the active material such that the proportions of the active material, graphite and polyvinylidene fluoride were 45:45:10 in weight ratio to prepare a negative electrode mixture. This mixture was molded under a pressure of 2 ton/cm² into a pellet having a diameter of 4.05 mm and a thickness of 0.23 mm.

The pellet had a weight of 5.2 mg. The negative electrode pellet 104 thus obtained was then adhered to a negative electrode case 105 using an electrode collector 102 comprising a conductive resin adhesive using carbon as a conductive filler to prepare a united body. This united body was dried through heating at 100° C. for 8 hours under reduced pressure. Further, a lithium foil 106 obtained by punching in a diameter of 4 mm and a thickness of 0.18 mm was press adhered on the pellet to produce a lithium-negative electrode pellet laminate electrode.

An electrolytic solution 107 used was a solution prepared by dissolving 1 mol/l of $LiClO_4$ in a mixed solvent of propylene carbonate, ethylene carbonate and ethyl methyl carbonate in the volume ratio of 1:1:2.

Figure 6:
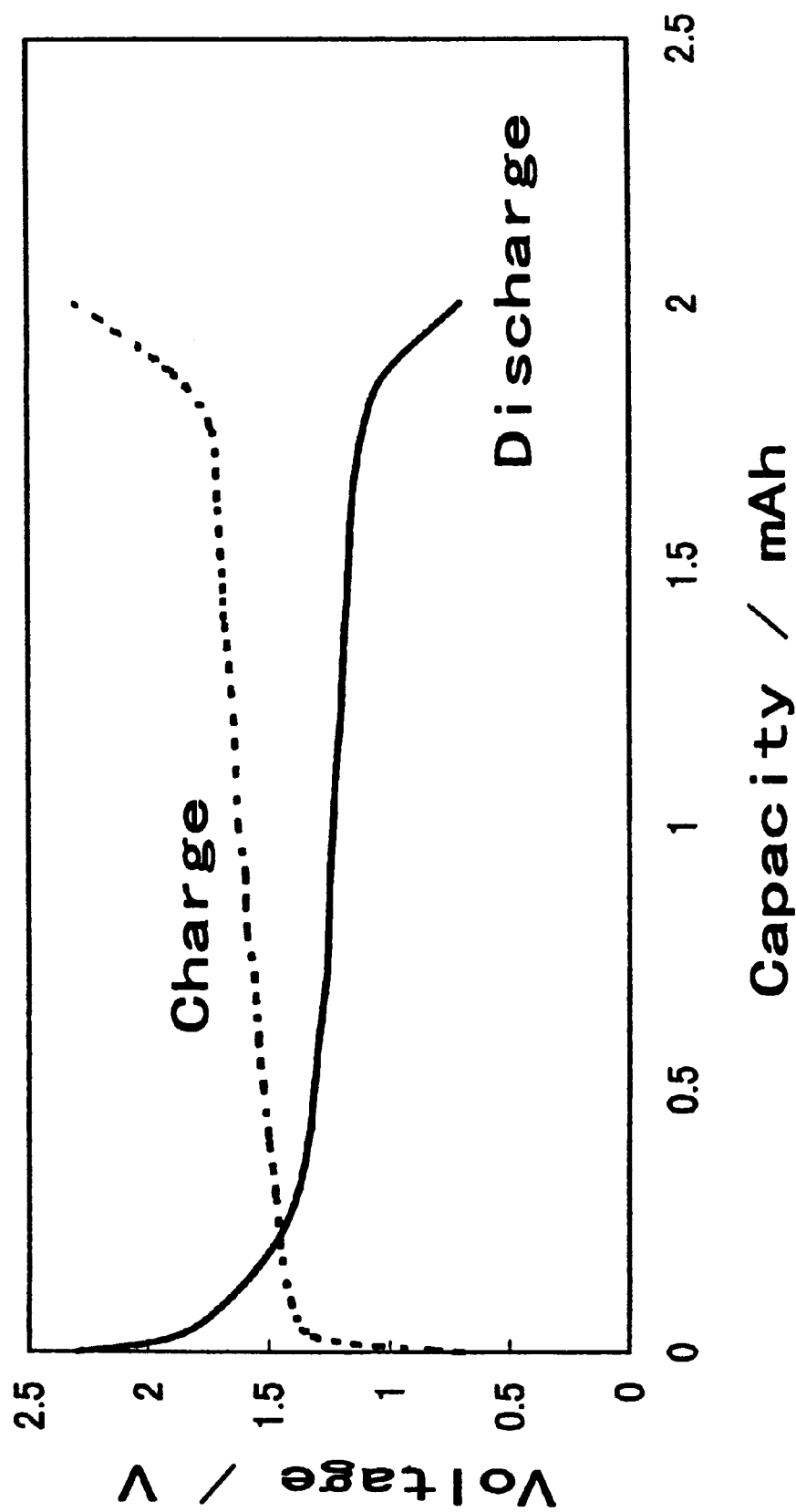
FIG. 6 is a graph showing charge and discharge characteristics of the lithium secondary battery of the present invention using $LiTi_2O_4$ as a positive electrode active material and SiO as a negative electrode active material.

The battery thus produced was subjected to a charge and discharge cycle under the condition of a constant current of 50 μA with a final voltage of 0.7 V of discharging and a constant current of 50 μA with a final voltage of 2.3 V for charging. Charge and discharge characteristics in this case are shown in FIG. 6.

Further, the battery after 100 cycles was disassembled (in moisture-free atmosphere) under charging state and also discharging state, and the positive electrode active material thereof was subjected to the X ray diffraction. As a result, it showed X ray chart having a diffraction peak at substantially the same position as that of $LiTiO_4$ (spinel)in either state.

EMBODIMENT 1-3

This embodiment is to investigate how inner resistance of the battery can be decreased by adding graphite as the conducting agent to the negative electrode active material. This embodiment was performed with a battery produced in the same manner as in Embodiment 1-1 except that only the amount of graphite added to silicon monoxide as the negative electrode was changed, and the positive electrode was $Li_{1.33}Ti_{1.66}O_4$. The batteries were produced by changing the amount of graphite to 30, 45 and 60% by weight based on the weight of the negative electrode pellet. The amount of the active material decreases as the amount of graphite increases. Therefore, the battery capacity is slightly decreased. For the sake of comparison, a battery was produced wherein lithium-containing manganese oxide prepared as described below was used as a positive electrode, and $Li_{1.33}Ti_{1.66}O_4$ was used as a negative electrode.

The positive electrode of the comparison battery was produced as follows. Electrolyzed manganese dioxide $MnO_2$, lithium hydroxide, and lithium nitrate were mixed such that the Mn/Li molar ratio was 1:0.3. The resulting mixture was heat-treated at 400° C. for 6 hours in atmosphere. The resulting product was used as an active material. Graphite as the conductive agent and crosslinking acrylic acid resin, fluororesin, and the like as the binder were mixed with the active material such that the proportions of the active material, graphite and the binder were 87:10:3 in weight ratio to prepare a positive electrode mixture. This positive electrode mixture was molded under a pressure of 2 ton/cm² into a pellet having a diameter of 4.05 mm and a thickness of 0.83 mm. Then, this pellet was dried through heating at 150° C. for 10 hours, and was used as a positive electrode.

Figure 7:
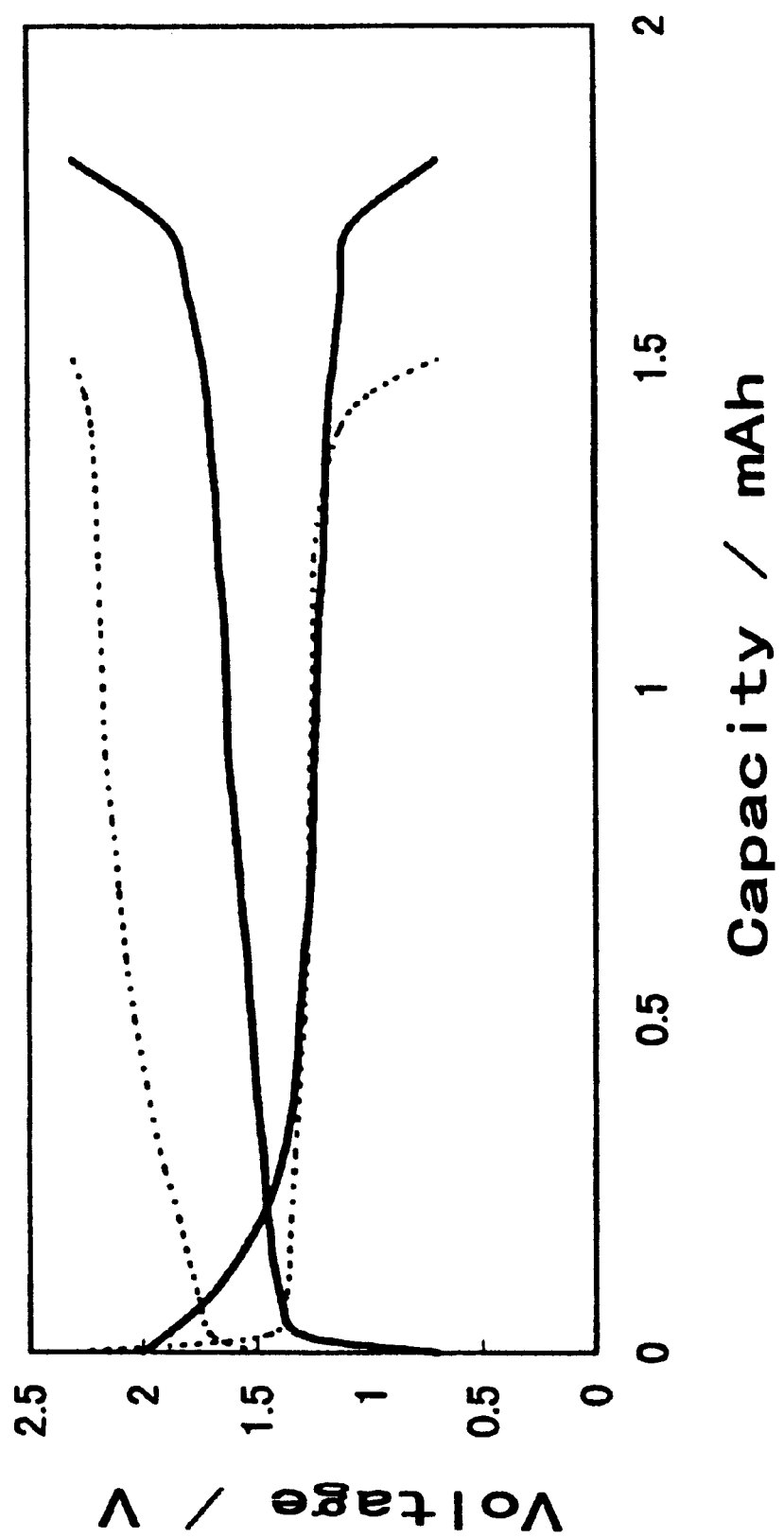
FIG. 7 is a graph showing charge and discharge characteristics of the battery 3 (solid line) of the present invention and the comparison battery (broken line)

Of the thus obtained batteries, inner resistance (measured by alternating current impedance method of 1 V and 1 kH) and charge and discharge results at 100 th cycle are shown in Table 1. By adding a large amount of graphite to the negative electrode, the inner resistance of a battery was decreased, resulting in a useful battery. Further, charge and discharge characteristics of the battery 3 of the present invention (solid line) and the comparison battery (broken line) are shown in FIG. 7. It is apparent from FIG. 7 that the battery of the present invention is small in polarization, and therefore can be charged at low voltage. Since lithium-containing silicon oxide used as the negative electrode active material has a large capacity, it is possible to design a secondary battery having small inner resistance while maintaining the capacity larger than that of the conventional battery.

TABLE 1

| No | Amount of graphite in Negative electrode mixture (%) | Inner resistance (ohm) | Capacity at 100th cycle (mAh) |
|---|---|---|---|
| Battery 1 of the present invention | 30 | 48 | 2.9 |
| Battery 2 of the present invention | 45 | 26 | 2.2 |
| Battery 3 of the present invention | 60 | 21 | 1.8 |
| Comparison battery | — | 56 | 1.4 |

As compared with the conventional battery using lithium-containing manganese oxide as the positive electrode and lithium-containing titanium oxide as the negative electrode, the battery of the present invention can decrease inner resistance while maintaining the capacity higher than that of the conventional battery.

EMBODIMENT 2-1

This embodiment is an embodiment where FeS was used as the positive electrode active material, and SiO was used as the negative electrode active material. Positive electrode, negative electrode and electrolytic solution produced as described below were used. Further, the size of the battery is that the outer diameter is 6.8 mm and the thickness is 2.1 mm. Cross sectional view of the battery is the same as in FIG. 4.

The positive electrode was produced as follows. The commercially available FeS was ground. Graphite as the conducting agent, and crosslinking type acrylic acid resin, a fluororesin, and the like as the binder were mixed with the powdered FeS such that the proportions of the powdered FeS, graphite, acrylic acid and fluororesin were 82:10:7:1 in weight ratio to prepare a positive electrode mixture. This positive electrode mixture was molded under a pressure of 2 ton/cm² into a pellet having a diameter of 4.05 mm and a thickness of 0.54 mm. The pellet had a weight of 21.0 mg. The positive electrode pellet 101 thus obtained was then adhered to a positive electrode case 103 using an electrode collector 102 comprising a conductive resin adhesive using carbon as a conductive filler to prepare a united body, and the united body was then dried through heating at 150° C. for 8 hours under reduced pressure.

The negative electrode was produced as follows. Commercially available silicon monoxide (SiO) was ground with an automatic mortar, and the particle size thereof was adjusted to have 44 μm or less. The resulting powder was used as the active material for the working electrode. Graphite as the conductive agent and polyvinylidene fluoride as the binder were mixed with the active material such that the proportions of the active material, graphite and polyvinylidene fluoride were 45:45:10 in weight ratio to prepare a negative electrode mixture. This mixture was molded under a pressure of 2 ton/cm² into a pellet having a diameter of 4.05 mm and a thickness of 0.49 mm.

The pellet had a weight of 11.5 mg. The negative electrode pellet 104 thus obtained was adhered to a negative electrode case 105 using an electrode collector 102 comprising a conductive resin adhesive using carbon as a conductive filler to prepare a united body. This united body was dried through heating at 100° C. for 8 hours under reduced pressure. Further, a lithium foil 106 obtained by punching in a diameter of 4 mm and a thickness of 0.4 mm was pressingly adhered on the pellet to produce a lithium-negative electrode pellet laminated electrode.

It is known from the experiment that of the clad lithium, lithium having x of from 1.5 to 2 in $Li_xSiO_y$ is a portion which does not participate in charge and discharge. Calculating this lithium as being 2, lithium used in charge and discharge is about 5.57 mAh. This lithium amount is 1.08 mol per mole of FeS, which is less than 1.1 mol, thereby the structure of FeS is not destroyed.

An electrolytic solution 107 used was a solution prepared by dissolving 1 mol/l of $LiClO_4$ in a mixed solvent of propylene carbonate, ethylene carbonate and ethyl methyl carbonate in the volume ratio of 1:1:2.

Figure 8:
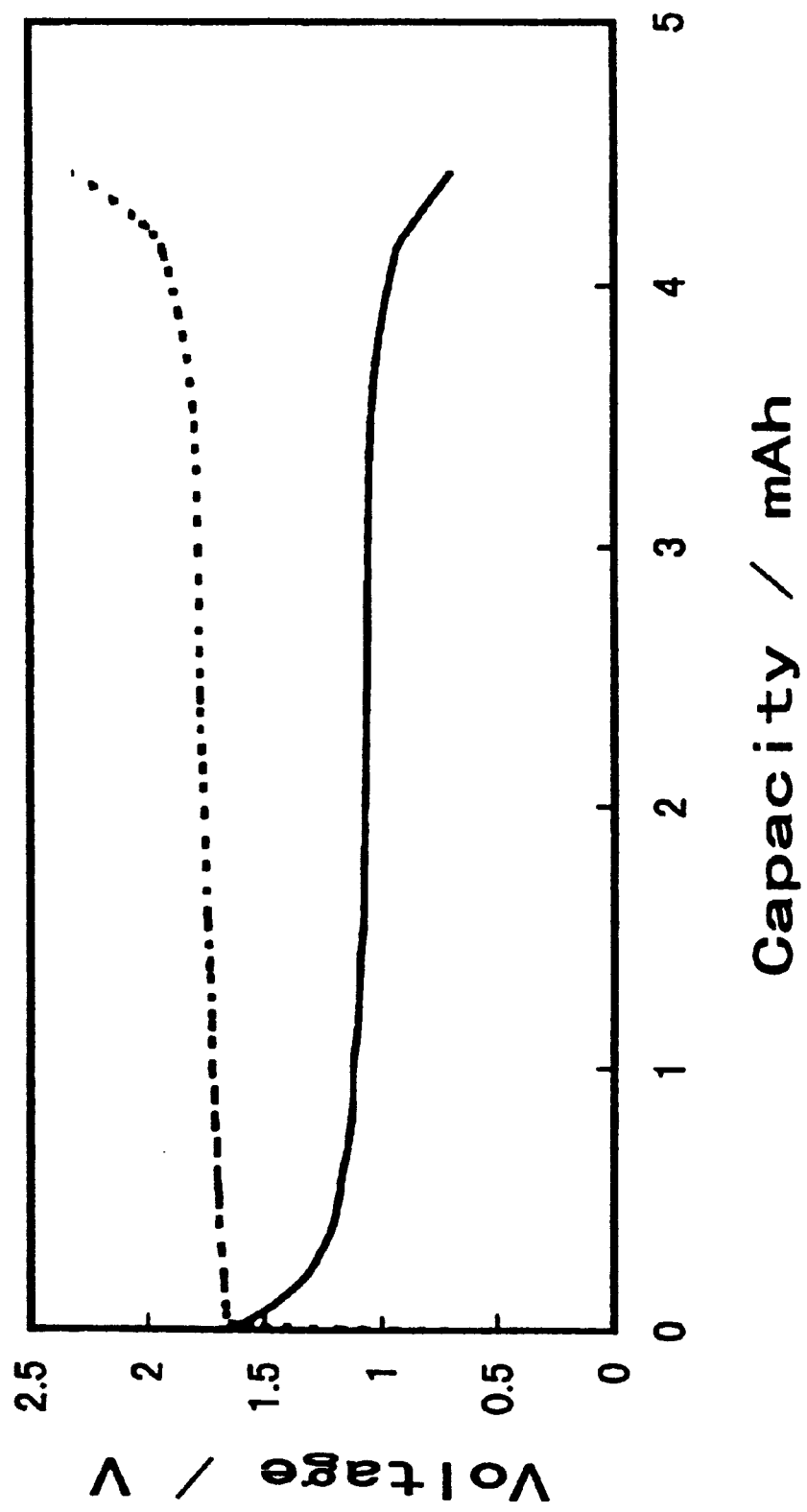
FIG. 8 is a graph showing charge and discharge characteristics of the lithium secondary battery of the present invention using FeS as a positive electrode active material and SiO as a negative electrode active material.

The battery thus produced was subjected to a charge and discharge cycle under the condition of a constant current of 50 μA with a final voltage of 0.7 V of discharging and a constant current of 50 μA with a final voltage of 2.3 V for charging. Charge and discharge characteristics in this case are shown in FIG. 8.

As described in detail above, the non-aqueous electrolyte secondary battery according to the present invention uses, as the negative electrode active material, lithium-containing silicon oxide represented by the compositional formula $Li_xSiO_y$ and defined such that the lithium content x and oxygen amount y are satisfied with $1.5 \leq x \leq 4.5$ and $0 < y < 2$, respectively, and also uses, as the positive electrode, lithium-containing titanium oxide represented by the general formula $Li_xTi_yO_4$ wherein $0 \leq x \leq 3$ and $1.6 < y < 2.2$ or lithium-containing iron sulfide represented by the general formula $Li_xFeS_y$ wherein $x \leq 1.1$ and $0.5 \leq y \leq 2.5$, so that a secondary battery of about 1.5 V having high energy density, less inner resistance and excellent charge and discharge characteristics can be obtained.

Further, a secondary batter having high charge and discharge efficiency, no occurrence of defect such as inner short-circuit due to the formation of dendrite, very high stability and long cycle life can be obtained. In addition, characteristics can be obtained having high charge and discharge efficiency, no occurrence of defect such as inner short-circuit due to the formation of dendrite, very high stability and long cycle life.

What is claimed is:

1. A non-aqueous electrolyte secondary battery comprising: a negative electrode having an active material comprised of lithium-containing silicon oxide; a positive electrode having an active material comprised of lithium-containing titanium oxide represented by composition formula $Li_xTi_yO_4$, where x and y satisfy $0.8<x<1.4$ and $1.6 \leq v \leq 2.2$; and a non-aqueous electrolyte.

2. A non-aqueous electrolyte secondary battery as claimed in claim 1; wherein the lithium-containing silicon oxide is represented by composition formula $Li_xSiO_y$, where x and y satisfy $0<x$ and $0<y<2$.

3. A non-aqueous electrolyte secondary battery as claimed in claim 1; wherein the lithium-containing silicon oxide is represented by composition formula $Li_xSiO_y$, where x and y satisfy $1.5 \leq x \leq 4.5$ and $0<y<2$.

4. A non-aqueous electrolyte secondary battery comprising: a negative electrode having an active material comprised of lithium-containing silicon oxide; a positive electrode having an active material comprised of lithium-containing titanium oxide represented by composition formula $Li_xTi_yO_4$, where x and y satisfy $0.8<x \leq 3$ and $1.6 \leq y \leq 2.2$; and a non-aqueous electrolyte.

5. A non-aqueous electrolyte secondary battery as claimed in claim 4; wherein the lithium-containing silicon oxide is represented by composition formula $Li_xSiO_y$, where x and y satisfy $0<x$ and $0 \leq y \leq 2$.

6. A non-aqueous electrolyte secondary battery as claimed in claim 4; wherein the lithium-containing silicon oxide is represented by composition formula $Li_xSiO_y$, where x and y satisfy $1.5 \leq x \leq 4.5$ and $0<y<2$.

7. A non-aqueous electrolyte secondary battery comprising: a negative electrode having an active material comprised of lithium-containing silicon oxide; a positive electrode having an active material comprised of lithium-containing iron sulfide represented by composition formula $Li_xFeS_y$, where x and y satisfy $x<1.1$ and $0.5<y<2.5$; and a non-aqueous electrolyte.

8. A non-aqueous electrolyte secondary battery comprising: a negative electrode having an active material comprised of lithium-containing silicon oxide; a positive electrode having an active material comprised of lithium-containing iron sulfide represented by composition formula $Li_xFeS_y$, where x and y satisfy $0.25 \leq x \leq 1.1$ and $0.7<y<1.3$; and a non-aqueous electrolyte.

* * * * *